(12) United States Patent
Murayama

(10) Patent No.: US 11,662,008 B1
(45) Date of Patent: May 30, 2023

(54) SPEED RATIO SWITCHING TYPE STRAIN WAVE GEARING

(71) Applicant: HARMONIC DRIVE SYSTEMS INC., Tokyo (JP)

(72) Inventor: Yuya Murayama, Azumino (JP)

(73) Assignee: HARMONIC DRIVE SYSTEMS INC., Tokyo (JP)

(*) Notice: Subject to any disclaimer, the term of this patent is extended or adjusted under 35 U.S.C. 154(b) by 442 days.

(21) Appl. No.: 17/053,469

(22) PCT Filed: May 17, 2019

(86) PCT No.: PCT/JP2019/019684
§ 371 (c)(1),
(2) Date: Nov. 6, 2020

(87) PCT Pub. No.: WO2020/234924
PCT Pub. Date: Nov. 26, 2020

(51) Int. Cl.
*F16H 49/00* (2006.01)
*F16H 1/32* (2006.01)
(Continued)

(52) U.S. Cl.
CPC ............ *F16H 49/001* (2013.01); *F16H 1/32* (2013.01); *F16H 3/24* (2013.01); *F16H 55/08* (2013.01);
(Continued)

(58) Field of Classification Search
CPC .................................................. F16H 49/001
(Continued)

(56) References Cited

U.S. PATENT DOCUMENTS 6,318,210 B1 * 11/2001 Kiyosawa ............... B41F 13/12
  74/640
2013/0247716 A1 * 9/2013 Takahashi ............ F16H 49/001
  74/640
(Continued)

FOREIGN PATENT DOCUMENTS

JP   H05215193 A   8/1993
JP   2016023745 A  2/2016

OTHER PUBLICATIONS

International Search Report (PCT/ISA/210) dated Jul. 2, 2019, by the Japan Patent Office as the International Searching Authority for International Application No. PCT/JP2019/019684.
(Continued)

*Primary Examiner* — Ha Dinh Ho
(74) *Attorney, Agent, or Firm* — Buchanan Ingersoll & Rooney PC

(57) ABSTRACT

A speed ratio switching type strain wave gearing can switch the speed ratio of output rotation with respect to one input rotation into two states or multiple states with a simple configuration. The speed ratio switching type strain wave gearing includes first and second internally tooted gears, an externally toothed gear having first and second external teeth formed on the external peripheral surface thereof, a wave generator that causes the first and second external teeth to partially mesh with the first and second internally toothed gears, a clutch mechanism that can selectively switch the first and second internally toothed gears into a fixed state. Input rotation from the wave generator can be reduced in speed at a different speed ratio and derived from the externally toothed gear by selectively switching the first and second internally toothed gears into a fixed state.

4 Claims, 3 Drawing Sheets

(51) Int. Cl.
*F16H 3/24* (2006.01)
*F16H 55/08* (2006.01)

(52) U.S. Cl.
CPC .............. *F16H 2049/003* (2013.01); *F16H 2200/0034* (2013.01); *F16H 2200/0039* (2013.01)

(58) Field of Classification Search
USPC ........................................... 74/640
See application file for complete search history.

(56) References Cited

U.S. PATENT DOCUMENTS

| | | | | |
|---|---|---|---|---|
| 2015/0316134 | A1* | 11/2015 | Hoshina | F16H 49/001 74/640 |
| 2016/0047451 | A1* | 2/2016 | Hoshina | F16C 33/4641 74/640 |
| 2016/0178044 | A1* | 6/2016 | Takizawa | F16H 49/001 74/640 |

OTHER PUBLICATIONS

Written Opinion (PCT/ISA/237) dated Jul. 2, 2019, by the Japan Patent Office as the International Searching Authority for International Application No. PCT/JP2019/019684.

* cited by examiner

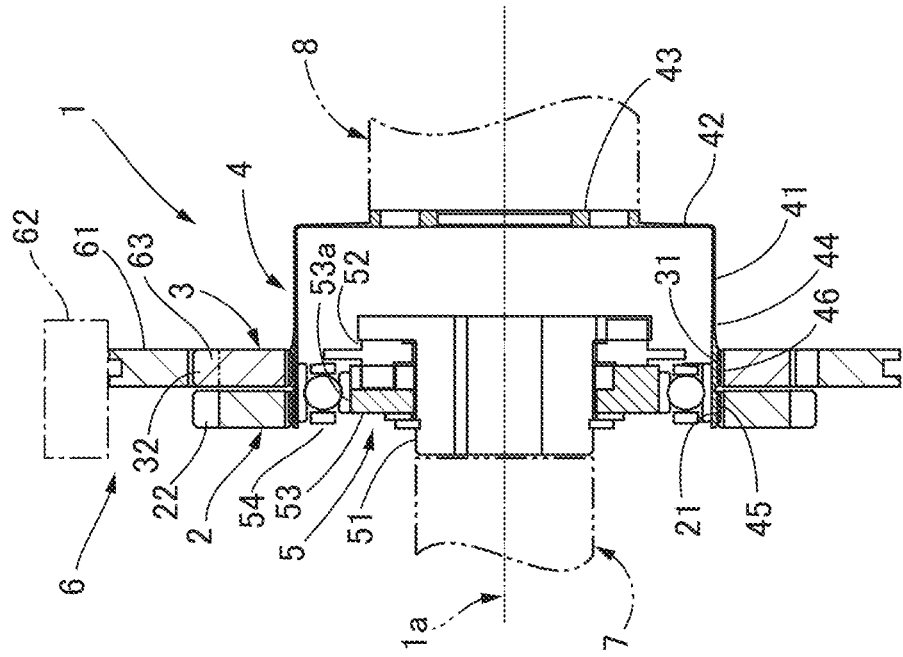
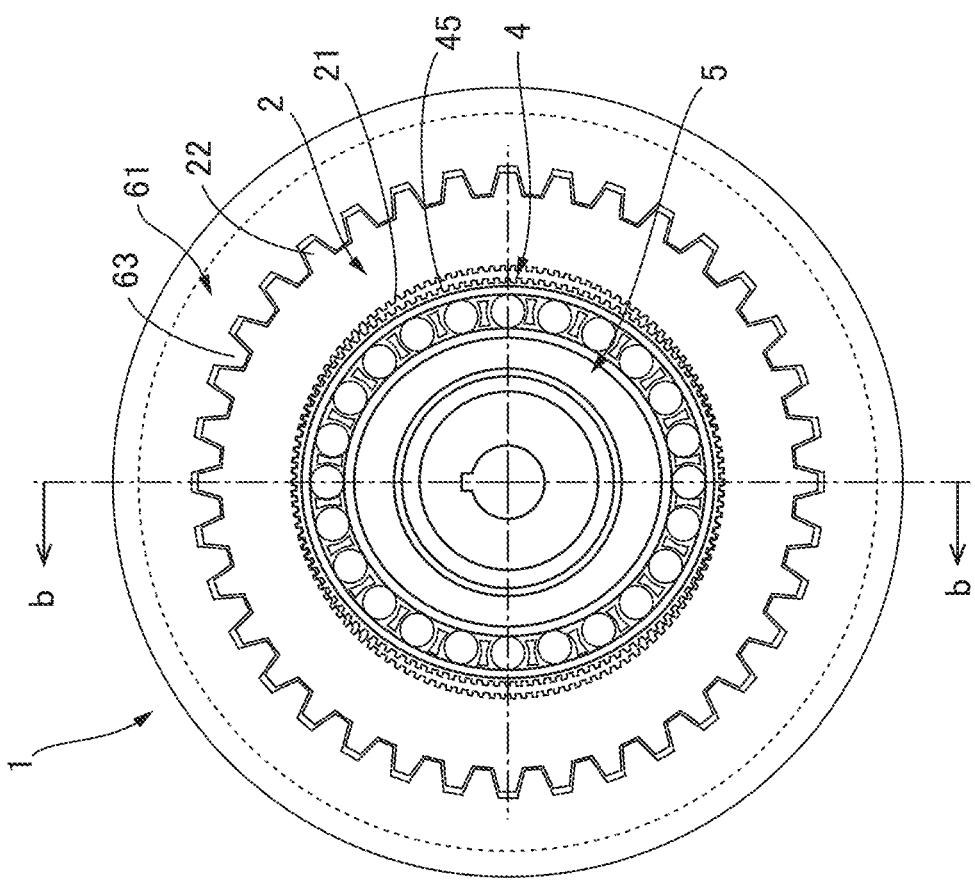

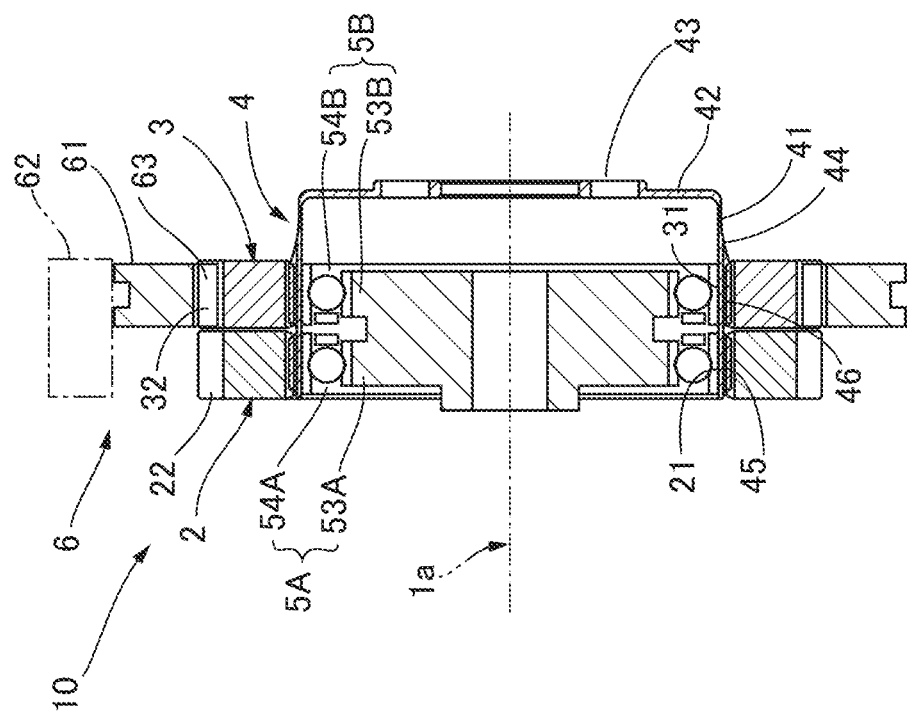

SPEED RATIO SWITCHING TYPE STRAIN WAVE GEARING

TECHNICAL FIELD

The present invention relates to a strain wave gearing, and particularly relates to a speed ratio switching type strain wave gearing in which a speed ratio of rotation output per one rotation input can be switched to two stages or multiple stages.

BACKGROUND ART

Strain wave gearings are provided with characteristics such as being small and lightweight and having high rotational precision, high load capacity, and a high reduction ratio, and are therefore used in industrial robots, NC machinery, etc. Required speed ratios of strain wave gearings differ depending on the applications of the gearings, and products having different speed ratios are therefore prepared. A reduction gear converts torque and rotational speed without altering the output of a motor, and maximum torque and maximum rotational speed of a gearing containing the reduction gear are therefore determined when the speed ratio is determined. With prior-art strain wave gearings, one strain wave gearing is provided per motor. Therefore, it has been the case that when the speed ratio of the strain wave gearing is set to a certain level, the maximum torque, maximum rotational speed, and other indices of performance of the gearing are set to a certain level in accordance with the speed ratio.

Patent Document 1 proposes a configuration in which, in order to obtain a rotation output of two degrees of freedom from one rotation input, two strain wave mechanisms are provided and a wave generator of one strain wave mechanism can be engaged with and disengaged from an input shaft via a clutch.

PRIOR ART LITERATURE

Patent Documents

[Patent Document 1] JP-A 5-215193

SUMMARY OF THE INVENTION

Problems to be Solved by the Invention

The purpose of the present invention is to provide a speed ratio switching type strain wave gearing in which a speed ratio of a rotation output relative to one rotation input can be switched to two stages or multiple stages by means of a simple configuration.

Means to Solve the Problems

A speed ratio switching type strain wave gearing of the present invention is characterized by comprising:
an externally toothed gear including a predetermined number of first external teeth formed on a cylindrical external peripheral surface capable of flexing in a radial direction, and a predetermined number of second external teeth formed in a different position along an axial direction from the first external teeth in the external peripheral surface of the cylinder;
a rigid first internally toothed gear which is disposed in a position of concentrically encircling the first external teeth, and which includes first internal teeth that can mesh with the first external teeth;
a rigid second internally toothed gear which is disposed in a position of concentrically encircling the second external teeth, and which includes second internal teeth that can mesh with the second external teeth;
a wave generator that causes the cylinder of the externally toothed gear to flex in the radial direction, causes the first external teeth to partially mesh with the first internal teeth, and causes the second external teeth to partially mesh with the second internal teeth; and
a clutch mechanism that is able to switch one of the first internally toothed gear and the second internally toothed gear, which are in a rotation-enabled state, to a rotation-disabled fixed state,
the number of the first external teeth and the second external teeth being the same or different,
the number of the first external teeth and the first internal teeth being different, and
the number of the second external teeth and the second internal teeth being different.

In this speed ratio switching type strain wave gearing, for example, the wave generator is a rotation input element and the externally toothed gear is a rotation output element. One of the first and second internally toothed gears, which are in a rotation-enabled state, is switched by the clutch mechanism to a rotation-disabled fixed state.

For example, the first internally toothed gear is switched to a rotation-disabled fixed state. When the wave generator rotates in this state, relative rotation occurs between the first external teeth of the externally toothed gear and the first internally toothed gear restricted from rotating, the relative rotation corresponding to the difference in the number of teeth between these two gears. The externally toothed gear rotates because the first internally toothed gear is fixed. The second internally toothed gear, which is meshed with the second external teeth of the externally toothed gear, is in a rotation-enabled state and therefore rotates integrally with the externally toothed gear. Therefore, rotation output, which is reduced in speed in accordance with the difference in the number of teeth between the first external teeth and the first internally toothed gear, is extracted from the externally toothed gear.

The clutch mechanism switches the second internally toothed gear to a rotation-disabled fixed state and returns the first internally toothed gear to a rotation-enabled state. Rotation input delivered to the wave generator thereby becomes rotation output reduced in speed in accordance with difference in the number of teeth between the second external teeth of the externally toothed gear and the second internally toothed gear, and this rotation output is extracted from the externally toothed gear. Thus, the speed ratio of the rotation output obtained from one rotation input can be switched to two stages. The speed ratio of the rotation output can be switched to multiple stages by increasing the number of the sets of external teeth formed on the cylinder of the externally toothed gear. It is possible to realize a strain wave gearing having a compact and simple configuration with which one rotation input can be reduced in speed at a speed ratio of two or more levels and outputted.

BRIEF DESCRIPTION OF THE DRAWINGS

FIG. 1($a$) is a front view and FIG. 1($b$) a cross-sectional view of a speed ratio switching type cup strain wave gearing according to Embodiment 1 to which the present invention is applied;

FIG. 2 is a cross-sectional view of Modification 1 of Embodiment 1 of FIGS. 1(a) and 1(b);

FIG. 3 is a cross-sectional view of Modification 2 of Embodiment 1 of FIGS. 1(a) and 1(b)

MODE FOR CARRYING OUT THE INVENTION

Figure 4:
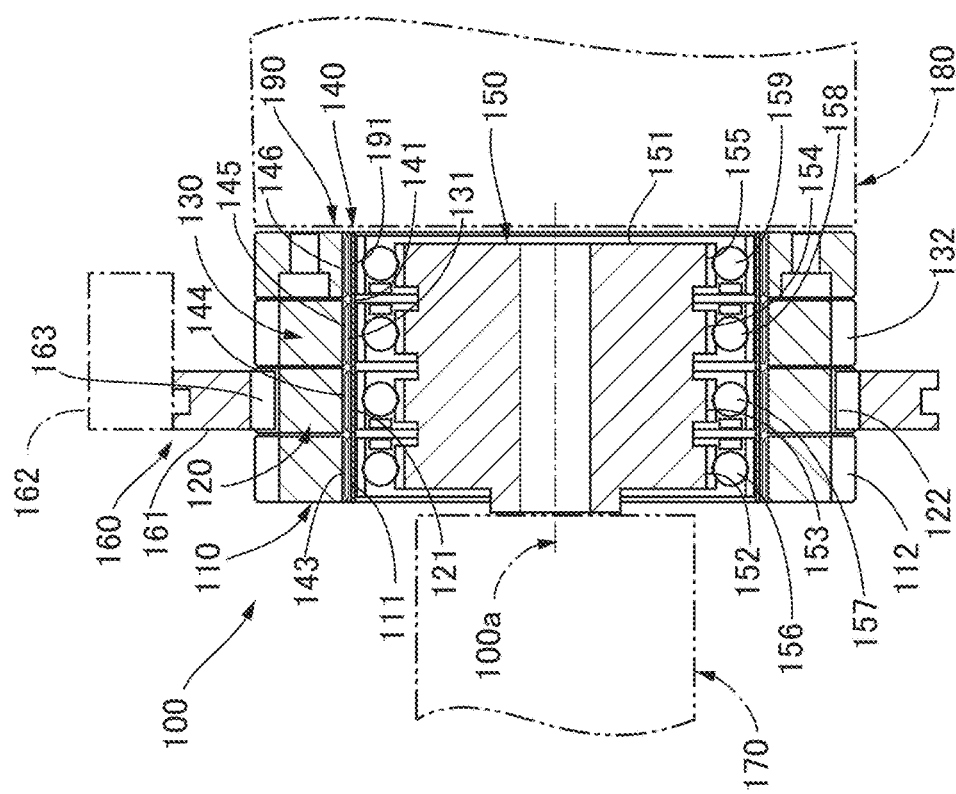
FIG. 4 is a cross-sectional view of a speed ratio switching type flat strain wave gearing according to Embodiment 2 to which the present invention is applied.

Below are descriptions, made with reference to the drawings, of speed ratio switching type strain wave gearings according to embodiments to which the present invention is applied.

EMBODIMENT 1

FIG. 1(a) is a front view of a speed ratio switching type cup strain wave gearing according to Embodiment 1, and FIG. 1(b) is a cross-sectional view of the same. The speed ratio switching type cup strain wave gearing 1 (referred to below simply as the "strain wave gearing 1") is provided with a first internally toothed gear 2, a second internally toothed gear 3, an externally toothed gear 4 having a cup shape, a wave generator 5, and a clutch mechanism 6.

The externally toothed gear 4 has a cup shape provided with a flexible cylinder 41 capable of flexing in a radial direction, a diaphragm 42 extending radially inward from a rear end of the cylinder 41, and an annular rigid boss 43 formed integrally on an internal peripheral edge of the diaphragm 42. A first number of first external teeth 45 and a second number of second external teeth 46 are formed on an external peripheral surface 44 of the cylinder 41. Specifically, the first external teeth 45 are formed on the external peripheral surface 44 of the cylinder 41, on a distal-end side portion thereof. The second external teeth 46 are formed on the external peripheral surface 44, in a portion adjacent to the first external teeth 45 along an axis 1a.

The first internally toothed gear 2 is disposed in a position where the gear 2 concentrically encircles the first external teeth 45 in the externally toothed gear 4. First internal teeth 21 formed on the first internally toothed gear 2 can mesh with the first external teeth 45, and the number of first internal teeth 21 is different from the number of first external teeth 45. The second internally toothed gear 3 is aligned with the first internally toothed gear 2 along the axis 1a, and is in a position where the gear 3 concentrically encircles the second external teeth 46 in the externally toothed gear 4. Second internal teeth 31 formed on the second internally toothed gear 3 can mesh with the second external teeth 46, and the number of second internal teeth 31 is different from the number of second external teeth 46.

The wave generator 5 causes the portions in the cylinder 41 of the externally toothed gear 4 where the first and second external teeth 45, 46 are formed to flex in the radial direction. Due to this flexing, the first external teeth 45 partially mesh with the first internal teeth 21 and the second external teeth 46 partially mesh with the second internal teeth 31. In the present example, the portions of the cylinder 41 where the first and second external teeth 45, 46 are formed are caused by the wave generator 5 to flex into an ellipsoidal shape, and at both long-axis ends of the ellipsoid, the first and second external teeth 45, 46 respectively mesh with the first and second internal teeth 21, 31. Therefore, the difference in the number of teeth between the first internal teeth 21 and the first external teeth 45 and the difference in the number of teeth between the second internal teeth 31 and the second external teeth 46 are both set to 2n (n being a positive integer).

The wave generator 5 includes a cylindrical hub 51, a rigid plug 53 mounted on an external peripheral surface of the hub 51 via an Oldham coupling 52, and a wave bearing 54. The rigid plug 53 includes an ellipsoidal external peripheral surface 53a. The wave bearing 54 is secured by being press-fitted in an ellipsoidally flexed state to the ellipsoidal external peripheral surface 53a.

The clutch mechanism 6 includes a ring-form clutch member 61 capable of sliding in the direction of the axis 1a, and a sliding mechanism 62 that causes the clutch member 61 to slide in the direction of the axis 1a. Engaging teeth 63 (splines) are formed on a circular internal peripheral surface of the clutch member 61. Engaging teeth 22, 32 (splines) capable of engaging with the engaging teeth 63 from the direction of the axis 1a are respectively formed on the circular external peripheral surfaces of the first and second internally toothed gears 2, 3. The clutch member 61 is able to slide in a direction parallel to the axis 1a, between an engagement position of engaging with the engaging teeth 22 of the first internally toothed gear 2 and an engagement position of engaging with the engaging teeth 32 of the second internally toothed gear 3.

In the strain wave gearing 1 having this configuration, for example, the wave generator 5 is a rotation input element, and a rotating input shaft 7 is connected to the wave generator as shown by imaginary lines. The externally toothed gear 4 is a rotating output element, and an output member 8 is connected to the rigid boss 43 as shown by imaginary lines. The first external teeth 45 and the second external teeth 46 of the externally toothed gear 4 partially mesh with the first internally toothed gear 2 and the second internally toothed gear 3, respectively. For example, the clutch member 61 is caused to mesh with the second internally toothed gear 3, the second internally toothed gear 3 is switched to a rotation-disabled fixed state, and the other first internally toothed gear 2 remains able to rotate. When the wave generator 5 rotates, relative rotation occurs between the second external teeth 46 of the externally toothed gear 4 and the fixed second internally toothed gear 3, the relative rotation corresponding to the difference in the number of teeth between these two gears. The externally toothed gear 4 rotates and rotation reduced in speed at a speed ratio corresponding to the difference in the number of teeth is outputted from the externally toothed gear 4 to the output member 8.

When the clutch member 61 is caused to slide toward the first internally toothed gear 2, the clutch member 61 disengages from the second internally toothed gear 3 and engages with the first internally toothed gear 2. The first internally toothed gear 2 switches to a rotation-disabled fixed state, and relative rotation occurs between the first internally toothed gear 2 and the first external teeth 45, the relative rotation corresponding to the difference in the number of teeth. Therefore, input rotation is reduced in speed by the externally toothed gear 4 at a speed ratio corresponding to the difference in the number of teeth between the first internally toothed gear 2 and the first external teeth 45, and speed-reduced rotation is outputted from the externally toothed gear 4 to the output member 8.

A limited time is needed for a speed-changing action to take place via the clutch member 61. The clutch member 61 is engaged with and disengaged from the first and second internally toothed gears 2, 3, which rotate integrally with the externally toothed gear 4 at comparatively low speeds. It is therefore possible to minimize the incidence of anomalous events caused by the speed-changing action being in progress.

In the present example, the wave generator 5 is a rotation input element and the externally toothed gear 4 is a rotation output element. Conversely, if the wave generator 5 is a rotation output element and the externally toothed gear 4 is a rotation input element, input rotation can be increased at a different speed ratio and extracted as increased rotation output.

Furthermore, the present invention can be applied to a top hat strain wave gearing provided with an externally toothed gear having a top hat shape, and to a flat strain wave gearing (see FIG. 4) provided with a cylindrical externally toothed gear.

(Modification 1)

FIG. 2 is a cross-sectional view of Modification 1 of the strain wave gearing 1. The basic configuration of the strain wave gearing 10 shown in FIG. 2 is the same as that of the strain wave gearing 1; therefore, the corresponding parts are denoted by the same symbols and descriptions thereof are omitted. The strain wave gearing 10 includes a number of wave generators corresponding to the number of speed-change levels. This is preferable because torque capacity thereby increases.

Specifically, the strain wave gearing 10 includes a first wave generator 5A that causes ellipsoidal flexure in the portion of the cylinder 41 of the externally toothed gear 4 where the first external teeth 45 are formed, and a second wave generator 5B that causes ellipsoidal flexure in the portion where the second external teeth 46 are formed. The first wave generator 5A includes a first rigid plug 53A having an ellipsoidal external peripheral surface (a first non-circular external peripheral surface), and a first wave bearing 54A mounted on the ellipsoidal external peripheral surface. Similarly, the second wave generator 5B includes a second rigid plug 53B having an ellipsoidal external peripheral surface (a second non-circular external peripheral surface), and a second wave bearing 54B mounted on the ellipsoidal external peripheral surface. In the present example, the first rigid plug 53A and the second rigid plug 53B are formed from a single component.

Flexure referred to as coning occurs in the cup-shaped externally toothed gear 4. The wave generator 5B, which is disposed on the diaphragm 42 side of the externally toothed gear 4, is preferably less of an ellipsoid than the wave generator 5A disposed on the opposite side, in accordance with there being less flexure caused by coning. Additionally, there is preferably a greater speed ratio on the side of the second external teeth 46 positioned on the diaphragm side where there is less flexure.

In the present example, the speed ratio is switched to two stages, but the strain wave gearing can also be configured such that the speed ratio is switched to three stages or multiple stages of a number greater than three, as in Embodiment 2 described hereinafter. A number of the sets of external teeth corresponding to the number of switching levels is preferably formed on the externally toothed gear, and the same number of internally toothed gears is preferably included.

(Modification 2)

FIG. 3 is a cross-sectional view of Modification 2 of the strain wave gearing 1. The basic configuration of the strain wave gearing 20 shown in FIG. 3 is the same as that of the strain wave gearing 1; therefore, the corresponding parts are denoted by the same symbols and descriptions thereof are omitted.

In the speed-changing configurations in the strain wave gearings 1, 10 (see FIGS. 1(*a*)-1(*b*) and 2) previously described, the engaging teeth 22, 32 (splines) are provided to the external peripheral surfaces of the first and second internally toothed gears 2, 3, the ring-form clutch member 61 having the engaging teeth 63 cut into the inner side is selectively caused to mesh with the first and second internally toothed gears 2, 3, the clutch member 61 is moved in the direction of the axis 1*a*, and the first and second internally toothed gears 2, 3 are switched between being fixed and free.

In the strain wave gearing 20 shown in FIG. 3, clutch mechanisms 6A, 6B are provided respectively to the first and second internally toothed gears 2, 3. Speed is changed by switching the clutch mechanisms 6A, 6B between on and off. The clutch mechanisms 6A, 6B are, for example, multiplate clutches. Various clutches can be used as the clutch mechanisms. For example, band type clutches can also be used, in which clutch bands are disposed so as to enclose the first and second internally toothed gears 2, 3 from the outer peripheral sides thereof.

EMBODIMENT 2

FIG. 4 is a cross-sectional view of a speed ratio switching type flat strain wave gearing according to Embodiment 2 of the present invention. A speed ratio switching type flat strain wave gearing 100 (referred to below simply as the "strain wave gearing 100") can switch a speed ratio to three stages, and includes a first internally toothed gear 110, a second internally toothed gear 120, a third internally toothed gear 130, a drive-side internally toothed gear 190, a cylindrical externally toothed gear 140, a wave generator 150, and a clutch mechanism 160.

The externally toothed gear 140 includes a flexible cylinder 141 capable of flexing in the radial direction. A first number of first external teeth 143, a second number of second external teeth 144, a third number of third external teeth 145, and a fourth number of fourth external teeth 146 are formed on an external peripheral surface of the cylinder 141. In the external peripheral surface of the cylinder 141, the first through fourth external teeth 143-146 are aligned in this order from one end toward another end in the direction of an axis 100*a*.

The first internally toothed gear 110 is disposed in a position where the gear 110 concentrically encircles the first external teeth 143 in the externally toothed gear 140. First internal teeth 111 formed on the first internally toothed gear 110 are able to mesh with the first external teeth 143, and the number of first internal teeth 111 is different from the number of first external teeth 143. The second internally toothed gear 120 is aligned with the first internally toothed gear 110 in the direction of the axis 100*a*, and is disposed in a position where the gear 120 concentrically encircles the second external teeth 144 in the externally toothed gear 140. Second internal teeth 121 formed on the second internally toothed gear 120 are able to mesh with the second external teeth 144, and the number of second internal teeth 121 is different from the number of second external teeth 144. The third internally toothed gear 130 is aligned with the second internally toothed gear 120 in the direction of the axis 100*a*, and is disposed in a position where the gear 130 concentrically encircles the third external teeth 145 in the externally toothed gear 140. Third internal teeth 131 formed on the third internally toothed gear 130 are able to mesh with the third external teeth 145, and the number of third internal teeth 131 is different from the number of third external teeth 145.

The drive-side internally toothed gear 190 is aligned with the third internally toothed gear 130 in the direction of the axis 100a, and is in a position where the gear 190 concentrically encircles the fourth external teeth 146 in the externally toothed gear 140. Internal teeth 191 formed on the drive-side internally toothed gear 190 are able to mesh with the fourth external teeth 146, and the number of internal teeth 191 is set to be the same as the number of fourth external teeth 146 so that the internal teeth 191 rotate integrally with the externally toothed gear 140.

The wave generator 150 causes radial flexure in the portions of the cylinder 141 of the externally toothed gear 140 where the first through fourth external teeth 143-146 are formed. Due to this flexure, the first external teeth 143 partially mesh with the first internal teeth 111, the second external teeth 144 partially mesh with the second internal teeth 121, the third external teeth 145 partially mesh with the third internal teeth 131, and the fourth external teeth 146 partially mesh with the internal teeth 191. In the present example, the portions of the cylinder 141 where the first through fourth external teeth 143-146 are formed are caused by the wave generator 150 to flex into an ellipsoidal shape, and at both long-axis ends of the ellipsoid, the first through fourth external teeth 143-146 respectively mesh with the first, second, and third internal teeth 111, 121, 131 and the internal teeth 191. Therefore, the difference between the number of first internal teeth 111 and first external teeth 143, the difference between the number of second internal teeth 121 and second external teeth 144, and the difference between the number of third internal teeth 131 and third external teeth 145 are all set to 2n (n being a positive integer).

The wave generator 150 includes a rigid plug 151 fixed to a rotation input shaft 170 shown by imaginary lines, four fixed-width ellipsoidal external peripheral surfaces 152-155 formed on an external peripheral surface portion of the rigid plug 151, and wave bearings 156-159 mounted on the ellipsoidal external peripheral surfaces 152-155. The wave bearings 156-159 are disposed in positions corresponding to the portions of the externally toothed gear 140 where the first through fourth external teeth 143-146 are formed.

The clutch mechanism 160 includes a ring-form clutch member 161 capable of sliding in the direction of the axis 100a and a sliding mechanism 162 that causes the clutch member 161 to slide in the direction of the axis 100a. Engaging teeth 163 (splines) are formed on a circular internal peripheral surface of the clutch member 161. Engaging teeth 112, 122, 132 capable of engaging with the engaging teeth 163 from the direction of the axis 100a are formed respectively on the circular external peripheral surfaces of the first through third internally toothed gears 110-130. The clutch member 161 is able to slide in sequence to engaging positions where the clutch member 161 can selectively engage with the engaging teeth 112, 122, 132 of the first through third internally toothed gears 110-130.

In the strain wave gearing 100 having this configuration, for example, the wave generator 150 is a rotation input element, and the rotation input shaft 170 is connected thereto. The drive-side internally toothed gear 190, which rotates integrally with the externally toothed gear 140, is a rotation output element, and an output member 180 is connected thereto. For example, the clutch member 161 is engaged with the second internally toothed gear 120, the second internally toothed gear 120 is switched to as rotation-disabled fixed state, and the other first and third internally toothed gears 110, 130 remain able to rotate. When the wave generator 150 rotates, relative rotation occurs between the second external teeth 144 of the externally toothed gear 140 and the fixed second internally toothed gear 120, the relative rotation corresponding to the difference in the number of teeth between these two gears. The externally toothed gear 140 rotates and rotation reduced in speed at a speed ratio corresponding to the difference in the number of teeth is outputted from the drive-side internally toothed gear 190, which rotates integrally with the externally toothed gear 140, to the output member 180. Similarly, rotation output at a different speed ratio is obtained by causing the clutch member 161 to slide toward the first internally toothed gear 110 or the third internally toothed gear 130.

In the present example, the wave generator 150 is a rotation input element and the drive-side internally toothed gear 190 is a rotation output element. Conversely, if the wave generator 150 is a rotation output element and the drive-side internally toothed gear 190 is a rotation input element, input rotation can be increased at a different speed ratio and extracted as increased rotation output. A multiplate clutch and other various clutch mechanisms can also be used as the clutch mechanism 160. Furthermore, the speed ratio can be switched to three stages in the present example, but the clutch mechanism can also be configured such that the speed ratio can be switched to two stages or to multiple stages of more than three, as in the case of Embodiment 1.

In the examples described above, an externally toothed gear is caused by a wave generator to flex into an ellipsoidal shape, and the externally toothed gear is meshed with an internally toothed gear. The externally toothed gear can also be caused by the wave generator to flex into a three-lobe shape or another non-circular shape, and the externally toothed gear can be meshed with the internally toothed gear at three or more positions in a circumferential direction.

The invention claimed is:

1. A speed ratio switching type strain wave gearing comprising:
    an externally toothed gear including a cylinder capable of flexing in a radial direction, a predetermined number of first external teeth formed on an external peripheral surface of the cylinder, and a predetermined number of second external teeth formed on the external peripheral surface of the cylinder, the second external teeth being formed in a different position along an axial direction from the first external teeth in the external peripheral surface of the cylinder;
    a rigid first internally toothed gear which is disposed in a position of concentrically encircling the first external teeth, and which includes first internal teeth that can mesh with the first external teeth;
    a rigid second internally toothed gear which is disposed in a position of concentrically encircling the second external teeth, and which includes second internal teeth that can mesh with the second external teeth;
    a wave generator that causes the cylinder of the externally toothed gear to flex in the radial direction, causes the first external teeth to partially mesh with the first internal teeth, and causes the second external teeth to partially mesh with the second internal teeth; and
    a clutch mechanism that is able to switch one of the first internally toothed gear and the second internally toothed gear, which are in a rotation-enabled state, to a rotation-disabled fixed state,
    the number of the first external teeth and that of the second external teeth being the same or different, the number of the first external teeth and that of the first internal teeth being different, and the number of the second external teeth and that of the second internal teeth being different.

2. The speed switching type strain wave gearing according to claim 1, wherein the wave generator includes a first wave generator to flex a portion of the cylinder of the externally toothed gear where the first external teeth are formed, and a second wave generator to flex a portion of the cylinder of the externally toothed gear where the second external teeth are formed;

the first wave generator includes a first rigid plug having a first non-circular external peripheral surface and a first wave bearing mounted on the first non-circular external peripheral surface; and the second wave generator includes a second rigid plug having a second non-circular external peripheral surface and a second wave bearing mounted on the second non-circular external peripheral surface.

3. The speed switching type strain wave gearing according to claim 1, further comprising:

a predetermined number of third external teeth formed in a different position along the axial direction from the first and second external teeth in the external peripheral surface of the cylinder; and a rigid drive-side internally toothed gear which is disposed in a position of concentrically encircling the third external teeth, and which includes internal teeth that can mesh with the third external teeth, wherein the wave generator causes the cylinder to flex in the radial direction and causes the third external teeth to partially mesh with the internal teeth of the drive-side internally toothed gear; and a number of the internal teeth of the drive-side internally toothed gear is the same as the number of the third external teeth so that the drive-side internally toothed gear integrally rotates with the externally toothed gear.

4. The speed ratio switching type strain wave gearing according to claim 3, wherein the wave generator includes a first wave generator to flex a portion of the cylinder of the externally toothed gear where the first external teeth are formed, a second wave generator to flex a portion of the cylinder where the second external teeth are formed, and a third wave generator to flex a portion of the cylinder where the third external teeth are formed;

the first wave generator includes a first rigid plug having a first non-circular external peripheral surface and a first wave bearing mounted on the first non-circular external peripheral surface;

the second wave generator includes a second rigid plug having a second non-circular external peripheral surface and a second wave bearing mounted on the second non-circular external peripheral surface; and the third wave generator includes a third rigid plug having a third non-circular external peripheral surface and a third wave bearing mounted on the third non-circular external peripheral surface.

* * * * *